US005103236A

United States Patent [19]

DuShane

[11] Patent Number: 5,103,236

[45] Date of Patent: Apr. 7, 1992

[54] ANTENNA MOUNT

[75] Inventor: Steve DuShane, Granada Hills, Calif.

[73] Assignee: Janiel Corporation, Chatsworth, Calif.

[21] Appl. No.: 455,604

[22] Filed: Dec. 20, 1989

[51] Int. Cl.[5] .......... H01Q 3/08; F16H 1/160; F16H 27/020

[52] U.S. Cl. .......... 343/765; 74/89.14; 74/425; 343/882

[58] Field of Search .......... 343/878, 880, 882, 890, 343/765, 766; 74/425, 409, 427, 89.14

[56] References Cited

U.S. PATENT DOCUMENTS

| | | | |
|---|---|---|---|
| 2,880,399 | 3/1959 | Murphy | 333/21 R |
| 4,612,551 | 9/1986 | Dreyer | 343/882 |
| 4,617,572 | 10/1986 | Hugo | 343/765 |
| 4,654,670 | 3/1987 | Fleming | 343/882 |
| 4,663,635 | 5/1987 | Wu | 343/765 |
| 4,841,309 | 6/1989 | Burr | 343/766 |

FOREIGN PATENT DOCUMENTS

| | | | |
|---|---|---|---|
| 3041065 | 6/1982 | Fed. Rep. of Germany | 74/427 |
| 0034069 | 2/1984 | Japan | 74/427 |

*Primary Examiner*—Michael C. Wimer
*Assistant Examiner*—Peter Toby Brown
*Attorney, Agent, or Firm*—Poms, Smith, Lande & Rose

[57] ABSTRACT

An improved mount for parabolic or similar antennas which allows for easier and more precise positioning of the antennae while providing a secure mount. The antenna mount includes a strut support mount in a mount base which comprises a circular plate with two parallel flanges. The two parallel flanges each have a hole in approximately their center which line up with a pair of diametrically opposed holes in the strut support mount. A turnbuckle assembly further secures the mount base to the strut support mount. Also included is an antenna pivot which includes a worm wheel at its base and a structure for securing an antenna. The antenna pivot is rotatably mounted on the mount base. A worm bracket assembly is affixed to the mount base in a manner such that the worm within the worm bracket drivingly engages the worm wheel of the antenna pivot. The worm bracket assembly further includes a threaded bearing which screws into the bracket such that it rotatably secures the worm and can be screwed down far enough to nearly eliminate any axial lash of the worm while roller bearings disposed on the shaft of the worm allow for nearly free rotation.

7 Claims, 2 Drawing Sheets

FIG. 2
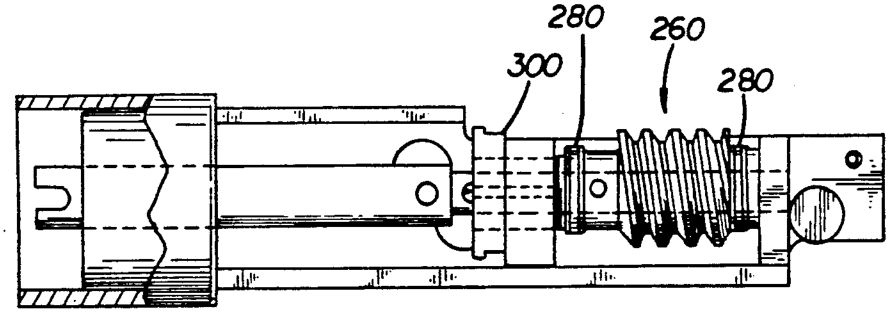
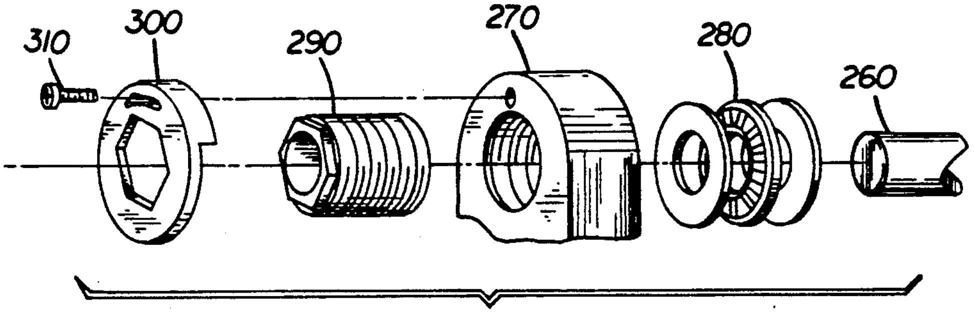
FIG. 3
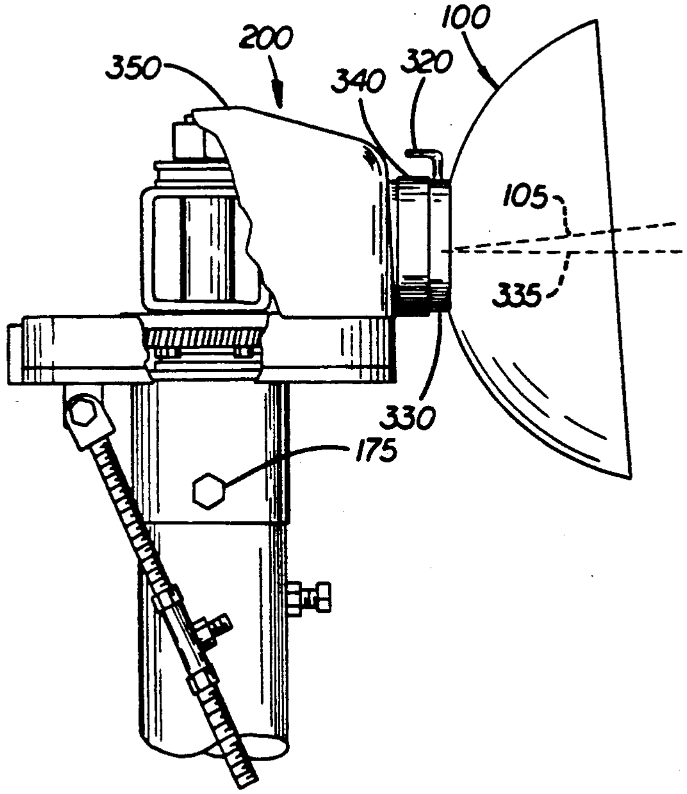
FIG. 4

ANTENNA MOUNT

FIELD OF THE INVENTION

The present invention relates to an improved mount for parabolic or similar antennas. Specifically, the invention rclates to an improved antenna mount for easily and precisely positioning a parabolic antenna for reception of signals from a satellite in geostationary orbit above the earth.

BACKGROUND OF THE INVENTION

The prior art, for example U.S. Pat. No. 4,663,635, issued May 5, 1987 to Wu, shows the use of a parabolic antenna mount comprising a base, a rotatable and swivelable table mounted on the base, and a gear system for rotating the table. Wu shows the use of a worm which drivingly engages a worm gear which is part of the table. Driving the worm causes the rotation of the table to which the antenna is mounted. The angle of inclination of the antenna is adjusted and set through the use of a swivel point which the table swivels about and a linking arm which connects the table to the base. The linking arm is fixed to the table at one end and has a slot in the other end of the linking arm whereby it can be adjustably secured to the base and hold the table at a fixed declination angle.

The prior art, as exemplified by U.S. Pat. No. 4,663,635, has disadvantages and drawbacks as a means for exactly and easily aiming the antenna and providing a secure mount for the antenna. Such antenna mounts commonly employ a worm gear system to rotate the antenna. Such systems have longitudinal play of the worm which is used to position the antenna. The longitudinal play prevents precise positioning. The longitudinal play of the worm exists because such systems do not have a means for immobilizing the worm's longitudinal movement without restricting its rotation. Further, the bearings which are used to secure the worm wear and provide additional undesired play. Such systems also commonly employ a pivot and turnbuckle arrangement to adjust the antenna's angle of declination. Those systems are also subject to rotational warp at the pivot point and lash from the linking arm or turnbuckle which prevent precise positioning of the antenna and also do not provide a secure mount for the antenna.

SUMMARY OF THE INVENTION

Therefore, it is an object of the present invention to provide a new and improved antenna mount which allows easy and precise positioning of the antenna while providing a secure mount. Specifically, it is an object of the invention to substantially eliminate the longitudinal play of the worm and thereby allow more precise positioning. It is a further object of the present invention to substantially eliminate play in the worm which results from wear of the bearings which secure the worm. It is a further object of the invention to substantially eliminate rotational warp at the pivot point of the antenna mount and lash from the turn buckle and thereby allow more precise positioning of the antenna and a secure antenna mount.

It is an important object of the present invention to provide a new and improved antenna mount which allows easy and precise positioning of the antenna while providing a secure mount. The antenna mount comprises a strut support mount which includes a hollow tube in a rectangular plate disposed perpendicularly to an axis to one end of the tube. Also included is a mount base which includes a circular plate, a means for securely attaching the mount base to the strut support in such a manner that the circular plate can be secured at various angles with respect to the axis of the hollow tube. Also included is an antenna pivot which includes a worm wheel at its base, means for securing an antenna, and a means for being rotatably mounted to the mount base so as to be rotatable in the plane of the circular plate. A worm bracket assembly which includes a worm, a bracket and a plurality of roller bearings is also included. The worm is rotatably supported in the bracket with a roller bearing disposed proximate to each end on the shaft of the worm so as to provide for nearly free rotation along the worms longitudinal axis with a substantial elimination of longitudinal play. The worm bracket assembly also includes means for affixing the assembly to the mount base such that the worm drivingly engages the worm wheel of the antenna pivot.

Another object of the present invention is to substantially eliminate the rotational warp at the pivot point and lash from the turnbuckle when these two assemblies are used to adjust and set the antenna's angle of declination. To accomplish that objective, the present invention employs two parallel flanges securely attached to the circular plate with the two flanges spaced so as to engage opposite edges of the rectangular plate of the strut support mount. Each of the flanges has a hole in approximately its center so that the flanges fit snugly over the rectangular plate and the holes in the flanges line up with diametrically opposed holes in the hollow tube and a fastener is securely fitted through all the holes and forms a pivot. The flanges in the turnbuckle assembly operate to securely position the antenna and substantially eliminate rotational warp at the pivot point and lash from the turnbuckle. Further, the turnbuckle assembly which an angle adjustment screw with means for being securely attached to the mount base and a hollow tube with a threaded nut attached to each end and a bolt directly fastened to the tube which can be directly fastened to a threaded connector on the support mount which minimizes play. The turnbuckle secures the antenna from rotating about the pivot.

These and other objects, advantages and features of the present invention will become readily apparent to those skilled in the art from a study of the following detailed description of the invention when read in conjunction with the attached drawings and appended claims.

BRIEF DESCRIPTION OF THE DRAWINGS

FIG. 2 is a partially exploded cutaway view of the worm gear assembly of the present invention.

FIG. 3 is an exploded view of a portion of the worm gear assembly of the present invention.

FIG. 4 shows the present invention with an antenna.

DETAILED DESCRIPTION OF THE INVENTION

Figure 1:
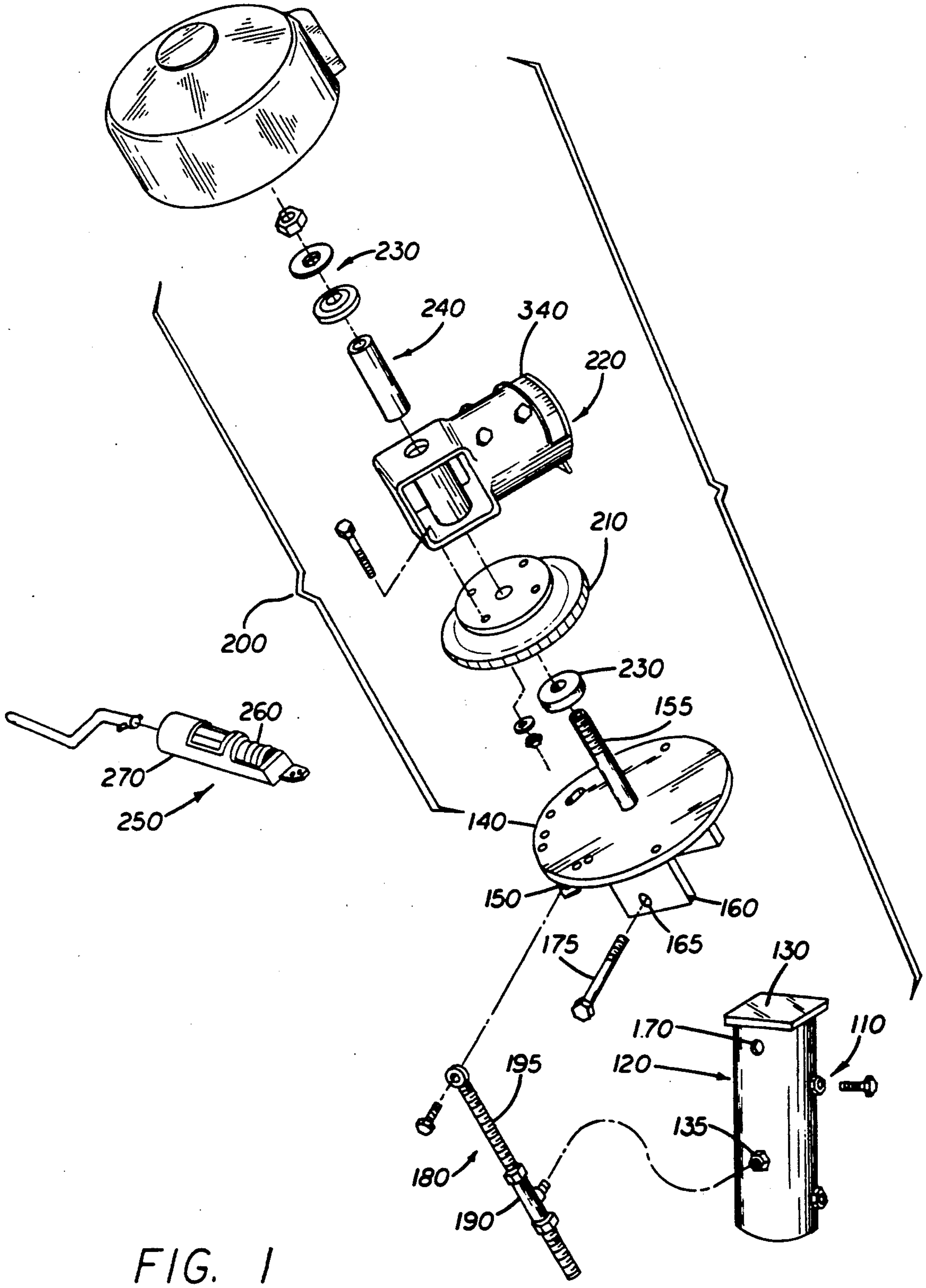
FIG. 1 is an exploded view of the antenna mount of the present invention.

FIG. 1 shows an exploded view of the best mode of the invention. The strut support mount 110 includes a hollow tube 120 and a rectangular plate 130 securely attached to one end of the hollow tube 120. The mount base 140 includes a circular plate 150 and two parallel flanges 160. The two parallel flanges 160 each have a hole 165 in approximately their center which line up with a pair of diametrically opposed holes 170 in the hollow tube 120 placed so as to line up with the holes 165 when the parallel flanges 160 are fitted over the rectangular plate 130.

A turnbuckle assembly 180 further secures the mount base 140 to the strut support mount 110. The guide tube 190 of the turnbuckle assembly 180 has a threaded appendage which allows it to be securely fastened to a threaded connector 135 on the hollow tube 120. One end of the "I" bolt 195 is designed to be securely attached by means of a bolt passing through the opening in the "I" bolt 195 into a threaded opening on the circular plate 150, thereby securely attaching one end of the turnbuckle assembly 180 to the mount base 140.

The antenna pivot generally indicated as 200 includes a worm wheel 210 at its base and a means for securing an antenna 220. The antenna pivot 200 further includes a means for being rotatably mounted on the mount base 140 indicated in the drawing as the threaded projection 155, thrust bearings 230, and pivot bearing 240. The worm bracket assembly 250 includes a worm 260, a bracket 270 and a pair of roller bearings 280 (shown in FIG. 3). The worm 260 is rotatably supported in the bracket 270 with one roller bearing disposed proximate to each end as shown in FIG. 2. The worm bracket assembly 250 further includes means for affixing itself to the mount base 140, such means could possibly be a plurality of holes in the bracket 270 made to receive bolts which would pass through those holes and bolt into threaded holes in the mount base 140. The worm bracket assembly 250 would then be securely attached to the mount base 140 such that the worm 260 would drivingly engage the worm wheel 210.

FIGS. 2 and 3 show more detail of the worm bracket assembly 250. The worm bracket assembly 250 includes a threaded bearing with engageable surfaces 290, a cap 300, and a locking screw 310. The threaded bearing 290 screws into the bracket 270 such that it rotatably secures the worm 260 and can be screwed down far enough to nearly eliminate any axial lash (movement along the longitudinal axis of the worm). The roller bearings 280 disposed on the shaft of the worm 260 allow the worm nearly free rotation while allowing the threaded bearing to immobilize the worm along its longitudinal axis. The locking cap 300 engages the engageable surfaces of the threaded bearing 290 and locking screw 310 screws into an appropriately placed hole in the bracket 270 and is used to prevent rotation of the threaded bearing 290 once the bearing has been screwed down far enough to prevent axial lash. The locking cap 300 and screw prevent the threaded bearing from backing out and allowing axial lash of the worm.

FIG. 4 shows the antenna mount with an antenna attached. The declination angle indicator 340 is attached to the mounting fixture 330. The mounting fixture 330 attaches to the antenna 100 such that the longitudinal axis 335 of the mounting fixture 330 is offset from the axis of the antenna 105. The end of the pointer 320 points to markings on the declination angle indicator 340 (see FIG. 1) which corresponds to the angle of declination of the antenna with respect to the mount base 140. The mounting fixture 330 is rotatably secured to the antenna pivot generally indicated in FIG. 3 as 200. FIG. 3 also shows a cutaway portion of a weatherproof cover 350 which is used to enclose and protect the mechanical elements of the antenna mount from weather damage.

The declination angle of the antenna can be grossly adjusted by rotating the antenna about the pivot point created by the fastener 175, the holes in the parallel flanges, and the holes in the tube, as shown in FIGS. 1 and 3. The parallel flanges 160 and the two edges of the rectangular plate 130 substantially eliminate any warp or movement of the mount base 140, except in the direction pivoting about the axis created by the fastener 175. Once the approximate desired declination angle has been achieved, the turnbuckle assembly 180 is employed to prevent any further rotation about the pivot point and to form a secure mount for the antenna.

Fine adjustments of the declination angle of the antenna 100 are made by rotating the antenna 100 and the mounting fixture 330. Because of the offset of the axis of the antenna from the longitudinal axis of the mounting fixture, such a rotation causes a change in the declination angle of the antenna. Such rotation also moves the pointer 320 to a new position over the declination angle indicator 340 and thereby indicates the current declination angle of the antenna.

Rotation of the antenna 100 generally about the axis of the hollow tube is accomplished by rotating the worm, either through the use of a hand-crank or an electrical motor or other means. The worm 260 drivingly engages the worm wheel 210 which is the base of the antenna pivot 200, and causes the entire antenna pivot, antenna mount and antenna to rotate.

It should be understood that the above detailed description describes only one preferred embodiment of the invention. The specific examples set forth herein are meant to be exemplary and not limiting. The invention is intended to include any modifications and/or variations that might appear to those skilled in the art which fall within the scope of the claims.

I claim:

1. An antenna mount comprising:

a strut support mount including a hollow tube and a plate having two parallel edges, said plate disposed perpendicularly to an axis of said hollow tube at one end thereof;

a mount base including means for securely attaching said mount base to said strut support mount such that said mount base can be secured at various angles with respect to said axis of said hollow tube;

an antenna pivot including a worm wheel at its base and means for securing an antenna, said antenna pivot further including means for being rotatably mounted on said mount base so as to be rotatable generally around an axis orthogonal to the center of said mount base;

a worm bracket assembly including a worm having a longitudinal axis and a shaft, a bracket, a plurality of roller bearings, a threaded bearing, a cap, and a locking screw, said worm being rotatably supported in said bracket with one roller bearing disposed proximate each end on said shaft of said worm so as to provide for nearly free rotation along said longitudinal axis of said worm;

said threaded bearing having first and second ends, said first end having engageable surfaces, said threaded bearing threadingly mounted in said bracket so as to rotatably secure said worm and so as to eliminate axial lash by said second end exerting compressive force on said roller bearings, said threaded bearing being restrained from rotational movement and firmly secured inside said bracket by said cap fitting over and securely engaging said engageable surfaces of said bearing and said locking screw securing said cap to said bracket; and said worm bracket assembly further including means for affixing said worm bracket assembly to said mount base such that said worm drivingly engages said worm wheel.

2. An antenna mount as claimed in claim 1, wherein said means for attaching said mount base to said strut support mount includes:

two parallel flanges securely attached to said mount base, said flanges engaging said two parallel edges of said plate of said strut support mount, each of said flanges having a hole located approximately in the respective corresponding centers of said flanges, said hollow tube further having a pair of diametrically opposed holes, said holes in said flanges coinciding with said pair of holes, said hollow tube and said flanges being adapted to receive a fastener which can be fitted through all of said holes;

a turnbuckle assembly having an angle adjustment screw, means for securely attaching said turnbuckle assembly to said mount base, and a hollow guide tube having a threaded nut securely fastened to each end and a bolt fastened to said guide tube, said bolt can be securely fastened to a threaded connector on said strut support mount; and whereby said flanges and said turnbuckle assembly operate to securely position said mount base such that an antenna secured by said means for securing an antenna would have generally the desired angle of declination.

3. An antenna mount as claimed in claim 1, wherein said means for securing an antenna comprises:

a declination angle indicator, a means for rotatably mounting an antenna, and an antenna assembly;

said antenna assembly including a parabolic antenna with an axis, a pointer, and a mounting fixture with a longitudinal axis;

said mounting fixture attached to said parabolic antenna such that said axis of said parabolic antenna is offset from said longitudinal axis of said mounting fixture;

said pointer secured to said mounting fixture such that it points to markings on said declination angle indicator which correspond to the angle of declination of the parabolic antenna with respect to the longitudinal axis of the mounting fixture.

4. An antenna mount as claimed in claim 1, wherein said mount base, said antenna pivot and said worm bracket assembly are contained within a substantially weatherproof cover.

5. An antenna mount comprising:

a strut support mount including a hollow tube and a plate having two parallel edges, said plate disposed perpendicular to a longitudinal axis of said hollow tube at one end thereof;

a mount base including a circular plate with a top surface;

means for attaching said mount base to said strut support mount, said means for attaching being operable to secure said circular plate at a plurality of alternative angles with respect to said longitudinal axis of said hollow tube;

an antenna pivot including a worm wheel, means for securing an antenna, and mounting means for rotatably mounting said worm wheel to said mount base parallel to said top surface of said circular plate; and a worm bracket assembly including a worm having a shaft and a longitudinal axis and a worm gear disposed longitudinally on said worm, a bracket having a threaded bearing providing rotatable support for said worm, and a plurality of roller bearings, said worm being rotatable supported in said bracket having one roller bearing of said plurality of roller bearings disposed proximate each end on said shaft of said worm so as to provide for nearly free rotation along said longitudinal axis of said worm with a substantial elimination of longitudinal play, said worm bracket assembly further including means for affixing said worm bracket assembly to said mount base such that said worm drivingly engages said worm wheel.

6. An antenna mount as claimed in claim 5, wherein said worm bracket assembly further includes a cap and a locking screw;

said threaded bearing having an end with engageable surfaces, said threaded bearing being threadingly mounted in said bracket so as to eliminate axial lash and rotatably secure said worm, said bearing being restrained from rotational movement and firmly secured inside said bracket by said cap fitting over and securely engaging said engageable surfaces of said threaded bearing and said locking screw securing said cap to said bracket;

whereby said worm is rotatably secured inside said worm bracket assembly and longitudinal movement of said worm is minimized.

7. An antenna mount as claimed in claim 5, wherein said means for securing an antenna comprises:

a declination angle indicator, a means for rotatably mounting an antenna, and an antenna assembly;

said antenna assembly including a parabolic antenna with an axis, a pointer, and a mounting fixture with a longitudinal axis;

said mounting fixture attached to said parabolic antenna such that said axis of said parabolic antenna is offset from the longitudinal axis of said mounting fixture;

said pointer secured to said mounting fixture such that it points to markings on said declination angle indicator which correspond to the angle of declination of the parabolic antenna with respect to said longitudinal axis of said mounting fixture.

* * * * *